United States Patent [19]
Leitz

[11] 3,929,246
[45] Dec. 30, 1975

[54] PLASTIC CONTAINER CAP UNIT WITH INTEGRAL SEALING RING

[75] Inventor: Wilfried Leitz, Bad Krozingen, Germany

[73] Assignee: Koninklijke Emballag Industrie Van Leer B.V., Amstelveen, Netherlands

[22] Filed: Feb. 24, 1975

[21] Appl. No.: 552,592

[30] Foreign Application Priority Data
Feb. 25, 1974 Germany............................ 2409015

[52] U.S. Cl. .............................................. 215/252
[51] Int. Cl.² ........................................ B65D 41/32
[58] Field of Search........................ 215/252, 7, 258

[56] References Cited
UNITED STATES PATENTS
3,455,478  7/1969  Fields et al. ......................... 215/252
3,650,428  3/1972  Miller ................................ 215/252

*Primary Examiner*—George T. Hall
*Attorney, Agent, or Firm*—Prutzman, Hayes, Kalb & Chilton

[57] ABSTRACT

A molded plastic closure cap unit having an upper closure cap, a lower integrally molded sealing ring with an inner diameter equal to the outer diameter of the closure cap and an intermediate shear zone with axially extending ribs integrally connecting the closure cap and sealing ring and forming a transition between opposed thin annular edges of the sealing ring and closure cap provided by their respective upwardly and downwardly tapering annular edge portions.

5 Claims, 4 Drawing Figures

PLASTIC CONTAINER CAP UNIT WITH INTEGRAL SEALING RING

BACKGROUND OF THE INVENTION

The present invention relates to a molded plastic closure cap unit for containers, such as bottles and the like, and having a closure cap for the neck opening of such containers and a lower sealing ring integrally molded with the closure cap and connected thereto with an intermediate shear zone for shearing the cap from the sealing ring to permit removal of the closure cap.

Such closure cap units conventionally have screw caps adapted to be screwed onto the top of the neck of a container and a lower sealing ring adapted to be flexed and/or deformed to engage and be retained by a bead or rim provided on the container neck when the closure cap unit is originally installed. When the container is opened for the first time, the sealing ring is retained by the bead or rim of the container and is separated from the closure cap by shearing the cap from the sealing ring along the intermediate shear zone. Thus, as long as the lower sealing ring remains connected to the closure cap, there is reasonable assurance that the container has not been opened.

When manufacturing closure cap units with integral lower sealing rings, the usual shear zone webs or ribs bridging the gap between the closure cap and sealing ring present some particular problems. One alternative is to form a shear or weakened zone in the closure cap unit intermediate the closure cap and sealing ring after the closure cap unit has been manufactured and also if desired after it has been properly installed on the container. Such requires the use of a suitable tool, for example a suitable toothed wheel adapted to be rolled around the periphery of the closure cap unit to form the shear or weakened zone. Another alternative is to form the shear zone during the process of molding the closure cap unit. Until now the required injection molding processes conventionally required complicated molding dies which were adapted to be opened not only in the axial direction of the closure cap unit but also in the radial direction as well.

In order to avoid the requirement for such complicated dies, it has been known to make the inner diameter of the lower sealing ring larger than the outer diameter of the closure cap and to make the webs or ribs bridging the intermediate weakened or shear zone to extend substantially at right angles or radially to the axis of the closure cap. However, such results in a relatively large diameter closure cap and sealing ring unit and in particular with an excessively large diameter sealing ring, such being particularly undesirable because of the concomitant requirement for a sufficiently large bead or rim on the neck of the container for retaining the sealing ring. Moreover, the sharp edges of the sheared webs or ribs which project radially from the closure cap would be bothersome and possibly cause injury when removing or re-inserting the closure cap.

BRIEF SUMMARY OF THE INVENTION

It is therefore an object of the present invention to overcome the above mentioned disadvantages and to provide a closure cap unit of the type described which facilitates economical manufacture and which enables the closure cap unit to be designed with an optimum diameter.

In accordance with the foregoing object, the closure cap unit of the present invention is made so that the inner diameter of the lower sealing ring is substantially equal to the outer diameter of the upper closure cap. As a result, the closure cap unit can be molded to form an intermediate annular shear zone between the closure cap and sealing ring using simple injection molding dies which open in the axial direction only. In addition, a simplified molding operation is achieved without requiring undesirably large dimensions of the closure cap and/or integral sealing ring. Consequently, the closure cap unit can be molded with a conveniently small diameter and to provide a particularly attractive unit when installed. Also, the usual bead or ring on the container neck may be of conventional size and whereby the container can be manufactured in the conventional manner and a specialized container is unnecessary.

A further important advantage of the present invention resides in the fact that, although the closure cap unit is capable of being molded with simple die tools opening in the axial direction only, the closure cap unit can be molded with shear zone webs or ribs which extend in the axial direction. Consequently, after the closure cap is initially removed, the remaining parts of the severed webs or ribs will not project radially outwardly from the closure cap as was previously the case where the sealing ring had an inner diameter larger than the outer diameter of the closure cap. In that latter case, the remaining sheared ends of the webs or ribs would project outwardly from the closure cap and would impair the appearance of the closure cap and container and would provide a source for possible injury when screwing the closure cap on or off.

In accordance with the present invention, the webs bridging the shear zone may be arranged at either the outer surface or inner surface of the cap and sealing ring. In the preferred embodiment, however, the webs are provided at the inner surface of closure cap and sealing ring, whereby they are virtually completely hidden when the closure cap unit is installed on a container, thereby further improving the appearance of the container and closure cap assembly.

According to a further preferred feature of the present invention, the shear zone is in cross section formed as a transition between two radius portions of the closure cap and sealing ring.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

FIG. I is an axial sectional view, partly in section, of an embodiment of a closure cap unit incorporating the present invention;

Figure 1:
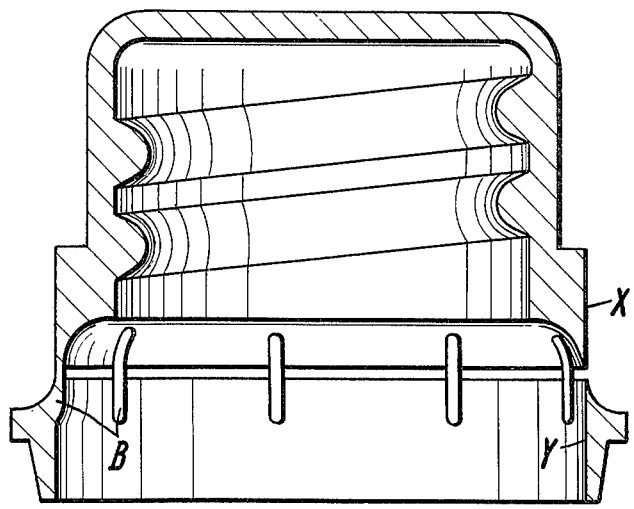
Figure 2:
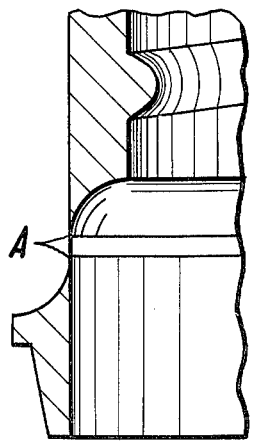
Figure 3:
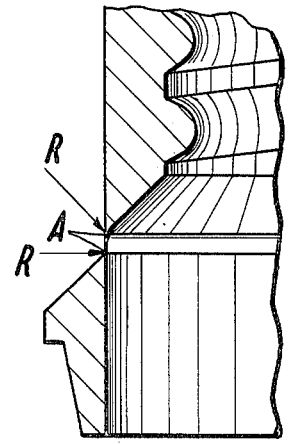
Figure 4:
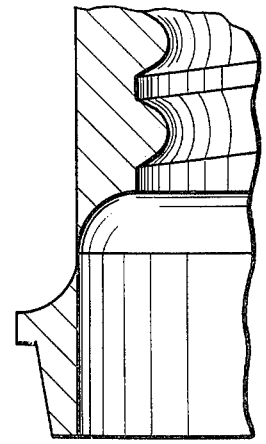

FIG. II is an enlarged partial axial sectional view, partly broken away and partly in section, of the closure cap unit of FIG. I; and FIGS. III and IV are enlarged partial axial sectional views, partly broken away and partly in section, similar to FIG. II, of modified embodiments of a closure cap unit incorporating the present invention.

DESCRIPTION OF THE PREFERRED EMBODIMENTS

Referring now to the drawing in detail, a first embodiment of an integrally molded closure cap unit of the present invention is shown in FIGS. I and II. The integrally molded closure cap unit shown comprises a lower annular sealing ring Y and an upper closure cap X having an internally threaded annular skirt for screwing the closure cap onto and off the neck of a bottle or like container (not shown) to close and open the bottle neck opening in a known manner. The annular closure cap skirt and sealing ring are coaxial and, as seen in FIG. I, the inner diameter of the lower sealing ring is equal to the outer diameter of the closure cap.

The closure cap unit has a shear zone A intermediate the upper closure cap and lower sealing ring and shown in FIGS. I and II as being formed as an annular slot or gap and with a plurality of equiangularly spaced axially extending webs or ribs B integrally connecting the coaxial sealing ring and closure cap. The webs or ribs B are shown formed to extend axially between the inner adjacent annular surface portions of the closure cap skirt and sealing ring, and those annular surface portions, though separated by the annular slot or gap of the shear zone A, collectively form a smoothly continuing surface therebetween so that they can be formed during a molding process with an axially opening male die part (not shown) of a suitable molding die assembly. Similarly, the outer adjacent annular surface portions of the closure cap skirt and sealing ring, though separated by the annular slot or gap of the shear zone A, also collectively form a smoothly continuing surface therebetween such that they can be formed during a molding process with an axially opening female die part (not shown) of the molding die.

The inner diameter of the lower sealing ring Y at its upper edge is the minimum diameter of the annular sealing ring (the sealing ring for the purposes of understanding is considered to exclude the ribs or webs B), and the outer diameter of the closure cap skirt at its lower edge is the maximum diameter of the annular skirt and such that overlapping portions of suitable male and female die parts of a suitable molding die assembly are adapted to coact to form the annular slot or gap of the shear zone A. Also, as can be seen upon reference to FIGS. I and II, the inner diameter of the annular sealing ring Y may be substantially constant, and if desired for molding purposes, the inner annular surface of the sealing ring may be tapered slightly inwardly toward the shear zone A. Likewise, as can be seen upon reference to FIGS. I and II, the outer diameter of the annular closure cap skirt may be substantially constant for a significant portion of the axial length of the skirt (or for the entire length of the skirt) above the shear zone, and if desired for molding purposes, the outer surface of the closure cap skirt may be tapered slightly outwardly toward the shear zone A. As a result of the foregoing, the upper annular portion of the lower sealing ring has a radial thickness tapering upwardly to a relatively sharp upper annular edge of the sealing ring, and the lower annular portion of the upper closure cap has a radial thickness tapering downwardly to a relatively sharp lower edge coaxial with and having the same diameter as the relatively sharp upper edge of the lower sealing ring.

The closure cap unit design of FIGS. I and II enables the closure cap unit to be manufactured by injection molding using simple die parts capable of opening only in the axial direction and without requiring a particularly large diameter sealing ring. Such is advantageous where the sealing ring has in the upper part thereof an annular outer flange (as illustrated in FIGS. I and II) which facilitates deforming and beading the lower annular edge of the sealing ring around a suitable rim or bead provided on the container neck.

The enlarged axial section view of the closure cap unit shown in FIG. II clearly shows that the shear zone A has a gap or slot which constitutes the transition between a tapering, radiused and concave outer annular surface and portion of the sealing ring Y and a tapering, radiused and concave inner annular surface end portion of the closure cap X. For the sake of clearness, the webs or ribs B have not been shown in FIG. II (and also have not been shown in the alternative embodiments shown in FIGS. III and IV).

Referring to FIG. III, a modified embodiment is shown which differs from the embodiment of FIGS. I and II in that the gap or slot forming the shear zone A separates two wedge-shaped, oppositely tapering upper and lower annular edge portions of the sealing ring Y and enclosure cap X respectively.

Referring to FIG. IV, the shear zone again provides a transition between two radiused or concave annular surface portions of the cap and sealing ring. However, in this embodiment, the radius profiles of the upper outer annular surface portion of the sealing ring and the lower inner annular surface portion of the closure cap skirt are directly tangential to each other and contact each other, so that there is no real gap but only a thin and very weak connecting portion that is bridged by the webs or ribs B (not shown) as in the embodiment of FIG. I.

In the modified embodiments of FIGS. III and IV, as well as in the embodiment of FIG. I, the inner diameter of the lower sealing ring is equal to the outer diameter of the closure cap, and the upper annular portion of the sealing ring has a radial thickness tapered upwardly to a relatively sharp or thin annular edge of the sealing ring, and the lower annular portion of the closure cap has a radial thickness tapering downwardly to a relatively sharp or thin lower edge coaxial with and having the same diameter as the relatively upper edge of the sealing ring.

As will be apparent to persons skilled in the art, various modifications, adaptations and variations of the foregoing specific disclosure can be made without departing from the teachings of the present invention.

I claim:

1. An integrally molded plastic closure cap unit for a bottle and like container and having a closure cap with an annular skirt and adapted to be removably inserted over a container neck opening with the annular skirt surrounding the neck of the container, and an annular sealing ring below the annular skirt of the closure cap contoured to be inserted around the container neck and retained thereon to prevent normal removal of the closure cap without severing the closure cap from the sealing ring, the inner diameter of the annular sealing ring being substantially equal to and coaxial with the outer diameter of the closure cap, and the closure cap unit having an annular shear zone intermediate the annular skirt and sealing ring with axially extending severable means interconnecting the annular skirt and annular sealing ring and adapted to be severed to permit the closure cap to be removed from the container.

2. The integrally molded plastic closure cap unit according to claim 1 wherein the severable means comprises a plurality of angularly spaced axially extending ribs interconnecting the annular skirt and annular sealing ring.

3. The integrally molded plastic closure cap unit according to claim 2 wherein the annular skirt and annular sealing ring have adjacent inner annular coaxial surfaces and wherein the axially extending ribs extend between said adjacent inner annular surfaces of the annular skirt and sealing ring.

4. The integrally molded plastic closure cap unit according to claim 1 wherein the annular skirt and annular sealing ring have inner and outer concave annular surfaces respectively contiguous to and extending mutually tangentially at the shear zone.

5. The integrally molded plastic closure cap unit according to claim 1 wherein the annular skirt and annular sealing ring have contiguous annular portions with radial thicknesses tapering toward the shear zone and forming opposed thin coaxial annular edge portions with substantially equal diameters.

* * * * *